US010255473B2

(12) United States Patent
Spencer Elkington et al.

(10) Patent No.: US 10,255,473 B2
(45) Date of Patent: Apr. 9, 2019

(54) GEOLOGICAL LOG DATA PROCESSING METHODS AND APPARATUSES

(71) Applicant: Reeves Wireline Technologies Limited, Leicestershire (GB)

(72) Inventors: Peter Adrian Spencer Elkington, Loughborough (GB); Said Assous, Nottingham (GB)

(73) Assignee: Reeves Wireline Technologies Limited, Leicestershire (GB)

( * ) Notice: Subject to any disclaimer, the term of this patent is extended or adjusted under 35 U.S.C. 154(b) by 4 days.

(21) Appl. No.: 15/471,656

(22) Filed: Mar. 28, 2017

(65) Prior Publication Data

US 2017/0199297 A1    Jul. 13, 2017

Related U.S. Application Data

(62) Division of application No. 13/789,374, filed on Mar. 7, 2013, now Pat. No. 9,715,615.

(30) Foreign Application Priority Data

Jun. 14, 2012  (GB) .................................. 1210533.4
Jan. 18, 2013  (GB) .................................. 1300933.7

(51) Int. Cl.
*G01V 1/50* (2006.01)
*G01V 3/36* (2006.01)
(Continued)

(52) U.S. Cl.
CPC .............. *G06K 9/00* (2013.01); *E21B 49/006* (2013.01); *G01V 1/50* (2013.01); *G01V 3/36* (2013.01); *G01V 3/38* (2013.01); *G06K 9/00503* (2013.01)

(58) Field of Classification Search
None
See application file for complete search history.

(56) References Cited

U.S. PATENT DOCUMENTS 4,567,759 A * 2/1986 Ekstrom ................. E21B 47/00
                                                324/355
7,054,753 B1    5/2006 Williams
(Continued)

FOREIGN PATENT DOCUMENTS

WO    2009/026979 A1    3/2009
WO    2009/126881 A2    10/2009
WO    2009126888 A2    10/2009

OTHER PUBLICATIONS

Search Report issued in corresponding Great Britain Application No. GB1300933.7 dated Jul. 9, 2013.
(Continued)

*Primary Examiner* — Matthew C Bella
*Assistant Examiner* — Jose Torres
(74) *Attorney, Agent, or Firm* — Blank Rome, LLP

(57) ABSTRACT

A method and a resistivity image logging tool connected or connectable to one or more processing devices process geological log data to construct missing information from destroyed or occluded parts using cues from observed data. The geological log data signals can be generated through use of the logging tool having one or more electrodes interacting with a formation intersected by a borehole. The processing involves the steps of: in respect of one or more data dimensions associated with missing values in a log data set, decomposing the signal into a plurality of morphological components; and morphologically reconstructing the signal such that missing values are estimated.

23 Claims, 11 Drawing Sheets

(51) Int. Cl.
    *G01V 3/38*           (2006.01)
    *G06K 9/00*           (2006.01)
    *E21B 49/00*         (2006.01)

(56) References Cited

U.S. PATENT DOCUMENTS

| | | |
|---|---|---|
| 8,095,316 B2 | 1/2012 | Thorne |
| 2002/0101235 A1 | 8/2002 | Schoen |
| 2010/0094557 A1 | 4/2010 | Yu et al. |
| 2011/0091078 A1 | 4/2011 | Kherroubi |
| 2012/0059616 A1* | 3/2012 | Zhao .................. G01V 3/20 |
| | | 702/85 |
| 2013/0116925 A1 | 5/2013 | Hruska |

OTHER PUBLICATIONS

Examiner's Second Report received in corresponding Australian Patent application 2013201434, dated Nov. 17, 2014.
Fadili, J.M. et al., "MCALab: Reproducible Research in Signal and Image Decomposition and Inpainting," IEEE COmputing in Science and Engineering, 2010, vol. 12(1), pp. 4463.
Examination Report issued in corresponding Australian Application No. 2013201434 dated Mar. 4, 2014.
Hennenfent et al, "Sparseness-constrained data continuation with frames: applications to missing traces and aliased signals in 2/3-D", SEG Technical Program Expanded Abstracts, 2005, pp. 2162-2165.
Elad, M. et al "Simultaneous cartoon and texture image inpainting using morphological component analysis (MCA)", Appl. Comput. Harmon, Anal. 2005, vol. 19, pp. 340-358.

* cited by examiner

GEOLOGICAL LOG DATA PROCESSING METHODS AND APPARATUSES

CROSS-REFERENCE TO RELATED APPLICATIONS

This is a divisional of U.S. application Ser. No. 13/789,374, filed 7 Mar. 2013, which is incorporated herein by reference and which claims priority under 35 U.S.C. § 119 to UK Appl. No. GB1210533.4, filed on 14 Jun. 2012, and UK Appl. No. GB1300933.7, filed on 18 Jan. 2013, the contents of each one incorporated herein by reference.

FIELD OF THE DISCLOSURE

The invention relates to geological log data processing methods and apparatuses. In particular the method and apparatus of the invention are useful for reconstructing missing or incomplete data in a region of a subterranean borehole that has undergone a logging process.

BACKGROUND OF THE DISCLOSURE

A geological formation may be penetrated by a borehole for the purpose of assessing the nature of, or extracting, a commodity of commercial value that is contained in some way in the formation. Examples of such commodities include but are not limited to oils, flammable gases, tar/tar sands, various minerals, coal or other solid fuels, and water.

When considering the assessment and/or extraction of such materials the logging of geological formations is, as is well known, economically an extremely important activity.

Virtually all commodities used by mankind are either farmed on the one hand or are mined or otherwise extracted from the ground on the other, with the extraction of materials from the ground providing by far the greater proportion of the goods used by humans.

It is extremely important for an entity wishing to extract materials from beneath the ground to have as good an understanding as possible of the conditions prevailing in a region from which extraction is to take place.

This is desirable partly so that an assessment can be made of the quantity and quality, and hence the value, of the materials in question; and also because it is important to know whether the extraction of such materials is likely to be problematic.

The acquisition of such data typically makes use of techniques of well or borehole logging. Logging techniques are employed throughout various mining industries, and also in particular in the oil and gas industries. The invention is of benefit in well and borehole logging activities potentially in all kinds of mining and especially in the logging of reserves of oil and gas.

In the logging of oil and gas fields (or indeed geological formations containing other fluids) specific problems can arise. Broadly stated this is because it is necessary to consider a geological formation that typically is porous and that may contain a hydrocarbon-containing fluid such as oil or natural gas or (commonly) a mixture of fluids only one component of which is of commercial value.

This leads to various complications associated with determining physical and chemical attributes of the oil or gas field in question. In consequence a wide variety of well logging methods has been developed over the years. The logging techniques exploit physical and chemical properties of a formation usually through the use of a logging tool or sonde that is lowered into a borehole (that typically is, but need not be, a wellbore) formed in the formation by drilling.

Broadly, in most cases the tool sends energy into the formation and detects the energy returned to it that has been altered in some way by the formation. The nature of any such alteration can be processed into electrical signals that are then used to generate logs (i.e. graphical or tabular representations containing much data about the formation in question) and, in the case of some logging tool types, images that represent conditions and substances in downhole locations.

An example of a logging tool type is the so-called multi-pad micro-resistivity borehole imaging tool, such as the tool 10 illustrated in transversely sectioned view in FIG. 1. In this logging tool an annular array of (in the example illustrated) eight pads 11 each in turn supporting typically two lines of surface-mounted resistivity electrodes referred to as "buttons" 12 is supported on a series of calliper arms 13 emanating from a central cylinder 14. During use of the tool 10 the arms 13 press the buttons 12 into contact with the very approximately cylindrical wall of a borehole. The borehole is normally filled with a fluid (such as a water-based mud) that if conductive provides an electrical conduction path from the formation surrounding the borehole to the buttons.

Many variants on the basic imaging tool design shown are known. In some more or fewer of the pads 11 may be present. The numbers and patterns of the buttons 12 may vary and the support arms also may be of differing designs in order to achieve particular performance effects. Sometimes the designers of the tools aim to create e.g. two parallel rows of buttons located on the pad one above the other. The buttons in the lower row are offset slightly to one side relative to their counterparts in the row above. When as described below the signals generated by the buttons are processed the outputs of the two rows of buttons are in effect lain over one another. As a result the circumferential portion of the borehole over which the buttons 12 of a pad 11 extend is logged as though there exists a single, continuous, elongate electrode extending over the length in question.

In general in operation of a tool such as resistivity tool 10 electrical current generated by electronic components contained within the cylinder 14 spreads into the rock and passes through it before returning to the pads 11. The returning current induces electrical signals in the buttons 12.

Changes in the current after passing through the rock may be used to generate measures of the resistivity or conductivity of the rock. The resistivity data may be processed according to known techniques in order to create (typically coloured) image logs that reflect the make-up of the rock and any minerals or fluids in it. These image logs convey much data to geologists and others having the task of visually inspecting and computationally analysing them in order to obtain information about the subterranean formations.

In use of a tool such as that shown in FIG. 1 the tool is initially conveyed to a chosen depth in the borehole before logging operations commence. The deployed location may be many thousands or tens of thousands of feet typically but not necessarily below, and in any event separated by the rock of the formation from, a surface location at which the borehole terminates.

Various means for deploying the tools are well known in the mining and oil and gas industries. One characteristic of most if not all of them is that they can cause a logging tool that has been deployed as aforesaid to be drawn from the deployed location deep in the borehole back towards the surface location. During such movement of the tool it logs the formation, usually continuously. As a result the image logs may extend continuously for great distances.

Although the logs are continuous in the longitudinal sense, notwithstanding the pad offsetting explained above they are azimuthally interrupted by reason of the pads not extending all the way continuously around the circumference of the borehole. The design of the tool prevents this since the arms 13 must be extensible in order to press the pads 11 into contact with the borehole wall. Following extension of the arms there exists a series of gaps between the ends of the pads.

No data can be logged in these gaps, which manifest themselves as elongate spaces in the image logs. An example of an image log 16 including several of these gaps or discontinuities 17 is visible in FIG. 2. The discontinuities extend from one end of the reconstructed image log to the other, a distance in some cases of thousands of feet.

Filling in the missing data is advantageous for obvious reasons of the desirability of completeness of information. Moreover it is likely to be required when it is desired to process the image logs using automatic pattern recognition programs in order to try and identify certain features in the logs.

SUMMARY OF THE DISCLOSURE

An aim of the invention is to produce dependable, continuous resistivity image logs notwithstanding the inability to log the gap regions.

The invention furthermore is suitable to make allowances for incomplete logging in a range of other types of log that may be produced for example with tools of types other than the exemplary, non-limiting resistivity tool described herein. A non-exhaustive list of applications of the invention includes: making up for missing data in a wide range of measurement systems used in open-hole situations and in which one or more sensors fails during logging; processing of log data from cased hole situations in which it is required to image the inside or the outside of the casing for the purpose of assessing its integrity or for similar reasons; creating other array measurement logs and signals that may or may not be rendered as images.

Examples of cased hole imaging measurements, to which the invention is applicable, include magnetic flux leakage measurements, ultrasonic scanning measurements and multi-fingered calliper measurements each of which will be known to the worker of skill in the art.

It has previously been proposed to try and make up for discontinuities of the kind described through the use of a 1D interpolation concept involving taking the rows of the image and applying cubic interpolation between the 1D data to restore the missed value at each interrupted data point. The process is applied to the whole image by scrolling down through rows. However, the results have been found to be very basic and not all the missed details are recovered.

Testing this approach on real data may give quickly generated answers but these tend to be far from perfect. The 1D interpolation technique is believed to fail in the homogenous image parts where straight vertical lines are visible. This issue can cause a problem when dealing with pattern recognition and edge detection, for example, since these vertical lines can appear as false edge detections.

For these reasons the inventors have rejected the 1D interpolation technique in favour of the methods and apparatuses defined and described herein.

Patent application no GB 1210533.4, from which this application claims priority, describes a technique of morphological component analysis (MCA) that is highly effective in reconstructing missing or occluded data in log data sets in general, and image log data in particular.

The inventors however have identified that improvements in the techniques described in application no GB 1210533.4 are possible and desirable.

Such improvements fall into two main categories:
- pre-processing of image log data in order to improve its suitability to undergo MCA processing, or other processing intended to make up for lost, missing or occluded data; and
- selection of the precise data generation technique that is most appropriate to the character of the log data and the processing capacity available.

In a first aspect according to the invention there is provided a method of preparing geological log data for processing to construct missing information from destroyed or occluded parts, the method comprising one or more of the steps of:

a. identifying and taking account of one or more null values in the log data;
b. compensating for at least one variation in one or more environmental factors that are variable depending on the environment to which the log data pertain;
c. normalising data within specific areas of the log data; and
d. normalising data between specific areas of the log data.

The inventors have found that the foregoing steps are desirable and helpful pre-processing steps that usefully condition the log data for treatment according to an MCA or other data re-creation technique.

Preferably the step a. of identifying and compensating for one or more null and/or outlying values (herein "null" values) in the log data includes a1. identifying one or more elements of the log data that exhibit a null value characteristic; a2. assessing whether each said element is relatively isolated in the elements of the log data or is relatively unseparated from other elements exhibiting a null value characteristic, the relative isolation being determined with reference to a predetermined measure of relative isolation; and a3. if a said element is relatively isolated, excluding it from further consideration.

This optional aspect of the method of the invention permits any subsequently performed steps of making up for missing data to avoid seeking to process the log data in areas that do not correspond to missing data of the general kinds described herein.

As a further, optional pre-processing step the step b. of the method, of compensating for the variation in sensitivity across the button array from one end of a pad of a resistivity logging tool to the other compensates for at least one variation in one or more environmental factors that are variable depending on the environment to which the log data pertain.

The inventors have found that the response of e.g. a pad of a resistivity image logging tool to environmental factors varies depending on the part of the pad under consideration. This is partly because each button electrode within a pad is sensitive to the resistivity of its surroundings to a slightly differing degree by virtue of the unique geometrical position of each button within a pad, which gives rise to systematic variations in current flow across the button arrays. It is also partly because the curvature of the pad almost never matches exactly the curvature of the part of the borehole wall against which it is pressed by the calliper arms, with the result that the spacings of individual pads from the material of the formation is not constant from one end of the pad to the other. This in turn may mean that more or less borehole fluid for example is interposed between the pads and the borehole wall, depending on the part of the pad under consideration.

However further factors are believed also potentially to be relevant to the sensitivity of the tool to environmental factors. In consequence optionally the step b. of compensating for at least one variation in one or more environmental factors that are variable depending on the environment to which the log data pertain includes compensating one or more elements of the log data for one or more variations selected from the following list including:
i. the standoff between the pads of the logging tool and the formation and/or
ii. variations in mudcake thickness and/or
iii. variations in mudcake constitution.

The inventors advantageously have found that the foregoing parameters can noticeably influence the environmental sensitivity of the logging tool.

Preferably the step c. of normalising data within specific areas of the log data includes calculating and applying an environmental correction factor, for each resistivity value derived from the log data, corresponding to a respective pad strip of a resistivity logging tool.

The inventors have found that this pre-processing step is useful and helpful in terms of improving the quality of log data reconstructed using the remainder of the method steps of the invention.

More preferably each said resistivity value is represented as a pixel in an image derived from the log data.

Even more preferably Step c defined above includes the sub-steps of:
c1. based on the number of resistivity values in a set of said log data corresponding to a respective line of pads, approximately determining the positions, in the said set of log data, of respective buttons of a said pad strip;
c2. determining the median value of resistivity of a centre resistivity value, of the said set of log data, determined with respect to a predetermined sliding depth window; and
c3. normalizing the other resistivity values of the set of log data to that of the centre resistivity value.

This sequence of method steps advantageously assists in reducing the effects of variations in the sensitivity to environmental factors that are apparent when comparing buttons in different parts of a pad, as summarised above.

The method of the invention also preferably includes defining a strip of resistivity values corresponding to a respective pad of a resistivity logging tool defining a window centred on a log depth measurement pertinent to the strip of resistivity values and for each line in the said window as necessary re-sampling the strip so that the number of resistivity values corresponds to the number of buttons in the pad before calculating the mean resistivity of the line; for each re-sampled column of resistivity values in the window, calculating the median of the pixel value for each line divided by the corresponding line mean; for each resistivity value in the line in question, dividing the resistivity value by the resulting column median; re-sampling the line to an initial resolution; repeating the foregoing steps for the next line and, when all the lines in a said strip have been so processed, repeating the steps in respect of a further said strip.

The inventors have found that the foregoing steps advantageously improve the uniformity of the image within pad strips compared with the prior art. Such steps may be repeated for one or more further values of log depth, until all the strips in a plurality of pads have been pre-processed in this fashion.

As a further part of the process of taking account of variations in the responses of different parts of a logging tool to environmental factors step d of the method of the invention, of normalising data between specific areas of the log data, includes calculating the average of a resistivity value for each pad of a multiple pad-derived resistivity log; and normalising the average resistivity values to a common resistivity value whereby to account for any differential sensitivity of respective said pads to conditions in the locations at which log data are acquired.

The use of normalised log data is made possible by the preceding steps, set out above, relating to compensating for variations in environmental sensitivity.

Conveniently the method includes the step of determining whether an image constructed based on the data includes more than a threshold proportion of sub-parallel sinusoids. If so the method then preferably includes performing a fast 2D correlation in order to construct missing information from destroyed or occluded parts of the image.

An advantage of selecting a 2D correlation approach to filling in missing data in the event of the number of sub-parallel sinusoids in an image under study exceeding a threshold number relates to the amount of processing capacity required to perform the steps of the method of the invention, described below, relating to Morphological Component Analysis (MCA).

MCA is computationally demanding to carry out. If therefore the image is suitable for treatment by another, computationally simpler, method this is performed in order to minimise processing time and requirements. The test of suitability in this regard identified by the inventors is that of the number of sub-parallel sinusoids, which in turn indicates the suitability of the image for processing by way of a 2D correlation technique in order to fill in missing or occluded data.

The 2D correlation method while less accurate than the MCA technique described herein is nonetheless an acceptable technique under some circumstances.

When however the 2D correlation method is in accordance with the test indicated above regarded as not suitable for the image log data in question, in accordance with a second aspect of the invention a method of processing geological log data to construct missing information from destroyed or occluded parts using cues from observed data comprises the steps of:
e. in respect of one or more data dimensions associated with missing values in a log data set, decomposing the signal into a plurality of morphological components and
f. morphologically reconstructing the signal such that missing values are estimated.

Preferably the method includes performing Steps e. and f. in respect of all the missing information in the data set.

Also preferably the morphological components include texture and piece-wise parts.

The approach of the method of the invention to filling in the missing data involves adopting a 2D concept and approaching the problem as an inverse one, in which it is necessary to de-convolve the targeted image from the observed (measured) one, which is basically the image convolved with a mask (the missing data). To do this it is necessary to introduce the MCA of an image. Successful MCA methods have many far-reaching applications in science and technology.

Because MCA is related to solving underdetermined systems of equations it might also be considered, by some, to be problematic or even intractable. The major problem involves decomposing a signal or image into superposed contributions from different sources assuming the overall signal or image was built by layered information. For example, an n-pixel image created by superposing K different types offers us n data (the pixel values) but there may be as many as n×K unknowns (the contribution of each content type to each pixel).

Relying on linear algebra, it is not recommended to attempt the decomposition and morphological reconstruction steps of the method of the invention as there are more unknowns than equations. On the other hand, if prior information is known about the underlying object, there are some rigorous results showing that such separation can be possible.

To this end the decomposition in a sparse representation includes use of a dictionary of elemental bases including one or more selected from the list including discrete cosine transforms (DCT), wavelet transforms, wavelet packet transforms, ridgelet transforms, curvelet transforms, and contourlet transforms.

Preferably the method of the invention includes the step of performing one or more automatic feature recognition and/or machine interpretation steps following Step f.

Further preferably at least one said automatic feature recognition and/or machine interpretation step includes one or more of an edge recognition step and/or a texture recognition step.

In more detail the method of the invention preferably includes the Step g. of separating each elemental signal base into a plurality of respective morphological components on the basis of an assumption that in order for each elemental signal behaviour base to be separated there exists a dictionary of elemental bases enabling its construction using a sparse representation.

Further preferably the method includes the Step h. of assuming that each respective morphological component is sparsely represented in a specific transform domain; and the Step i. of amalgamating each transform attached to a respective morphological component into a dictionary. The dictionaries referred to herein may thus advantageously be formed from the data of the signals undergoing processing in accordance with the method of the invention.

The method may in such a case advantageously and efficiently then include the Step j. of identifying the sparsest representation of morphological components and using the thus-identified components to de-couple the components of the signal content. The invention furthermore optionally may include the use of a pursuit algorithm to carry out Step j.

Basis pursuit (BP) is a principle for decomposing a signal into an "optimal" superposition of dictionary elements, where optimal means having the smallest l1 norm of coefficients among all such decompositions.

The method of the invention fills in missing data considerably more accurately than the prior art 1D method described above. The inventors have found that this increased accuracy made apparent the variations, described above, in the environmental sensitivity factor of each button of a resistivity imaging tool, this relating to the transformation of measured resistance at a button to the required resistivity, and comprising parts related to the geometry of the tool and parts relating to the environment in which the tool operates.

Conveniently in preferred embodiments of the invention the piece-wise parts are or include image content; the Step e. includes separating the texture parts and image content; and the method includes separately constructing information missing from the texture parts and image content, before performing Step f.

The inventors have found this approach to be computationally achievable in an acceptable time period.

Preferably the geological log data are measures of formation resistivity in the form of an image containing N pixels; and further preferably the method includes representing the geological log data as a one-dimensional vector, of length N, by lexicographic ordering.

In more detail preferably the method of the invention includes the Step e1. of representing the image content by a dictionary:

$$A_n \in \mathcal{M}^{N \times L}$$

wherein the basis pursuit algorithm is such the image content is sparsely represented in dictionary $A_n$.

Furthermore for the avoidance of doubt preferably sparsity as used herein is quantified by one of a plurality of quasi-norms.

Preferably the quasi-norm is the $l_0$ norm, which is equivalent to the number of non-zero components in the vector x and $l_p$-norms $\|x\|_p = (\Sigma |x(i)|^p)^{1/p}$ with p<1, and in which small values of any of these indicate sparsity. However other quasi-norms may be suitable for use in the method of the invention, as further described below.

When the quasi-norm is the $l_0$ norm, preferably the pursuit algorithm seeks to solve:

$$\{\underline{x}_n^{opt}\} = \underset{\{\underline{x}_n\}}{\operatorname{argmin}} \|\underline{x}_n\|_0 \text{ s.t. } \underline{Y} = A_n \underline{x}_n$$

with the result that $A_n \underline{x}_n$ contains the image content.

Again, the preferred approach therefore advantageously seeks to treat the image content parts separately. This is believed to be a major contributor to the ability of the method of the invention successfully to perform MCA on image log data.

In another embodiment of the method of the invention, the quasi-norm is the $l_1$, norm, and the pursuit algorithm seeks to solve $$\{\underline{x}_n^{opt}\} = \underset{\{\underline{x}_n\}}{\operatorname{argmin}} \|\underline{x}_n\|_1 \text{ s.t. } \underline{Y} = A_n \underline{x}_n$$

with the result that $A_n \underline{x}_n$ contains the image content.

In such a case, the pursuit algorithm preferably is a basis pursuit (BP) that solves the expression using linear programming.

In more detail, preferably the pursuit algorithm seeks to solve:

$$\{\underline{x}_n^{opt}\} = \underset{\{\underline{x}_n\}}{\operatorname{argmin}} \|\underline{x}_n\|_1 \text{ s.t. } \|\underline{Y} - A_n \underline{x}_n\|_2 < \varepsilon$$

in which ε is a parameter corresponding to the level of noise in the image log Y, with the result that $A_n \underline{x}_n$ contains the image content.

Alternatively, the pursuit algorithm may seek to solve:

$$\{\underline{x}_n^{opt}\} = \underset{\{\underline{x}_n\}}{\operatorname{argmin}} \|\underline{x}_n\|_1 + \lambda \|\underline{Y} - A_n \underline{x}_n\|_2^2 + \gamma TV\{A_n \underline{x}_n\}$$

in which TV represents a total variation penalty and the parameter λ>0 is a scalar representation parameter and the total variation penalty increases the sparseness gradient of $A_n\underline{x}_n$, with the result that $A_n\underline{x}_n$ contains the image content.

Conveniently, the Step f. may include assuming that pixels, of an image log, corresponding to missing log data are indicated by a mask matrix $M \in \mathcal{M}^{N \times L}$ the main diagonal M of which encodes the pixel status as 1 in the case of an existing pixel and 0 is the case of missing data and wherein the pursuit algorithm seeks to solve:

$$\{\underline{x}_n^{opt}\} = \underset{\{\underline{x}_n\}}{\operatorname{argmin}} \|\underline{x}_n\|_1 + \lambda \| \underline{M(Y} - A_n\underline{x}_n)\|_2^2 + \gamma TV\{A_n\underline{x}_n\}$$

with the result that $A_n\underline{x}_n$ contains the image content.

For the avoidance of doubt, the method of the invention includes within its scope a method of processing geological log data including carrying out the steps of Paragraph [0030] hereof followed by the steps of at least Paragraph [0051] hereof.

The invention also resides in a resistivity image logging tool having operatively connected or connectable thereto one or more processing devices for carrying out on data signals generated by the tool a method as defined herein.

Furthermore, in accordance with the invention, there is provided a programmable processing device that is programmed to carry out a method as defined herein.

In yet a further aspect of the invention, there is provided data processed in accordance with a method as defined herein.

BRIEF DESCRIPTION OF THE DRAWINGS

There now follows a description of preferred embodiments of the invention, by way of non-limiting example, with reference being made to the accompanying drawings in which.

DETAILED DESCRIPTION OF THE DISCLOSURE

As explained hereinabove, the use of e.g. a multi-pad micro-resistivity tool, or any of a number of other logging tool types, can lead to discontinuities in the data used to assemble image logs. Also as explained, these discontinuities manifest themselves as coherent bands or lines 17 as shown in FIGS. 2 and 3 that are empty of data.

Figure 2:
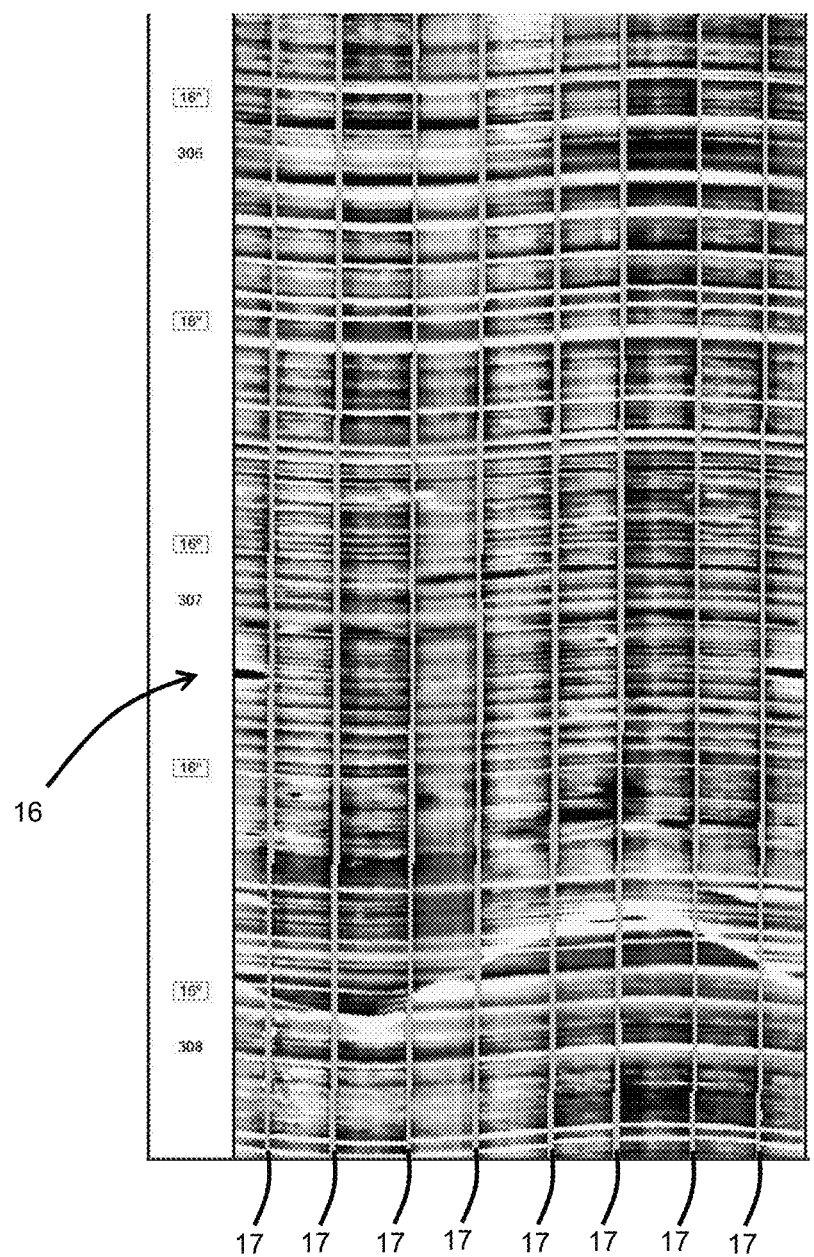
FIG. 2 is an example of an image log that has been created from the output of a resistivity logging tool such as that of FIG. 1, in which the elongate data gaps are starkly apparent as coherent lines extending along the length of the image and to which the method of the invention beneficially is applicable.

FIG. 2 illustrates the kinds of data void that arise through use of a known imaging tool having an outer diameter in use (i.e. when the moveable calliper arms are deployed) of 4.2 inches. In one known form of such a tool each pad 11 supports two parallel rows of twelve buttons 12. The rows are offset as described above. This arrangement gives rise to the comparatively narrow, but still significantly inconvenient, bands 17 of no data in the image log.

Figure 3:
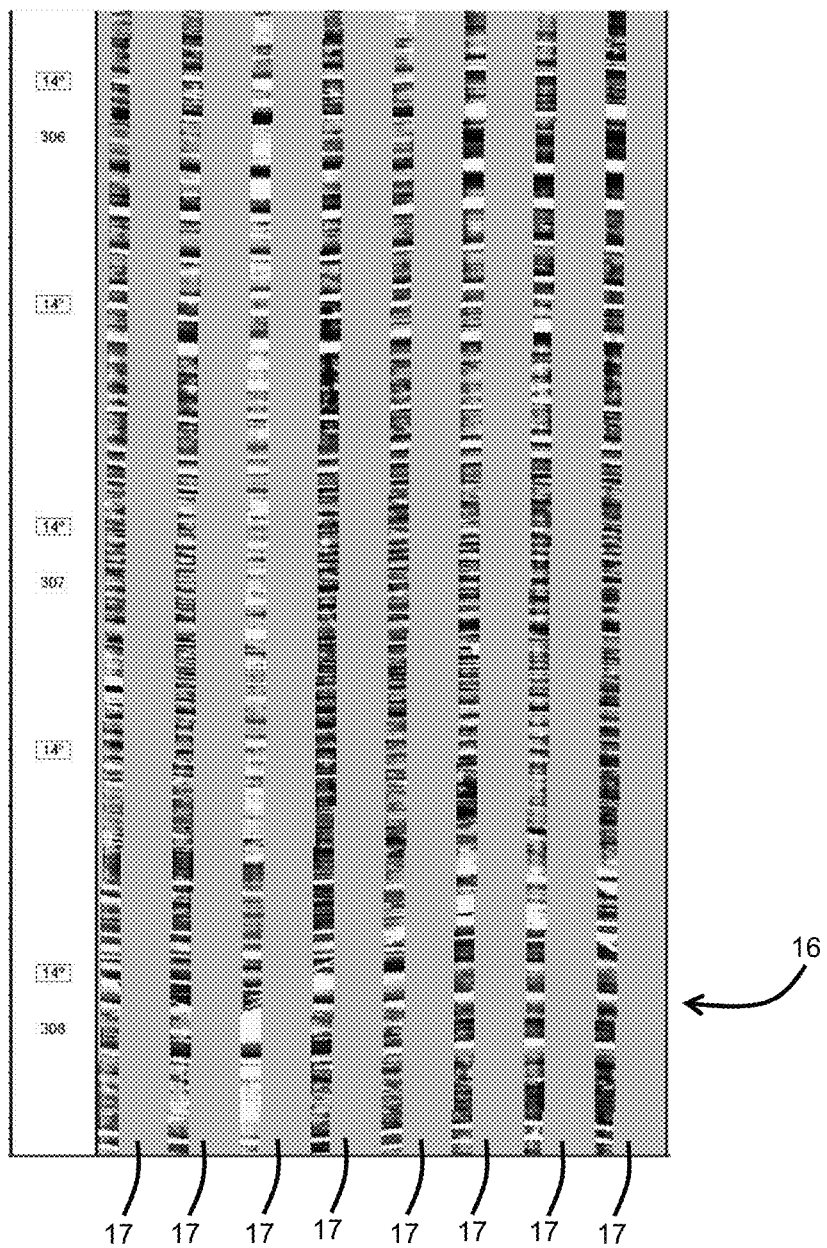
FIG. 3 is an example of another image log exhibiting the missing data phenomenon as a result of the pad and arm design of the resistivity imaging tool used to acquire the log data, and to which the method of the invention beneficially is applicable.

FIG. 3 shows the much broader voids that arise through use of a resistivity tool having an outer diameter in use of 2.4 inches.

One form of tool of this size has pads 11 each supporting two parallel, offset rows of four buttons 12. The gaps between the ends of the sets of offset rows are greater as a result of the smaller size of and greater spacing between the pads so the data void bands 17 are significantly wider than in FIG. 2.

Patent application no GB 1210533.4 describes an MCA In-Painting method the effect of which is to fill in the missing data in image logs such as those of FIGS. 2 and 3, in a manner that is consistent with the remainder of the data in the log and that allows subsequent processing and interpretation of the resulting whole image. The inventors however as stated have realised that a certain amount of pre-processing of the image log data is desirable in order to render the MCA In-Painting technique as successful as possible.

Figure 4:
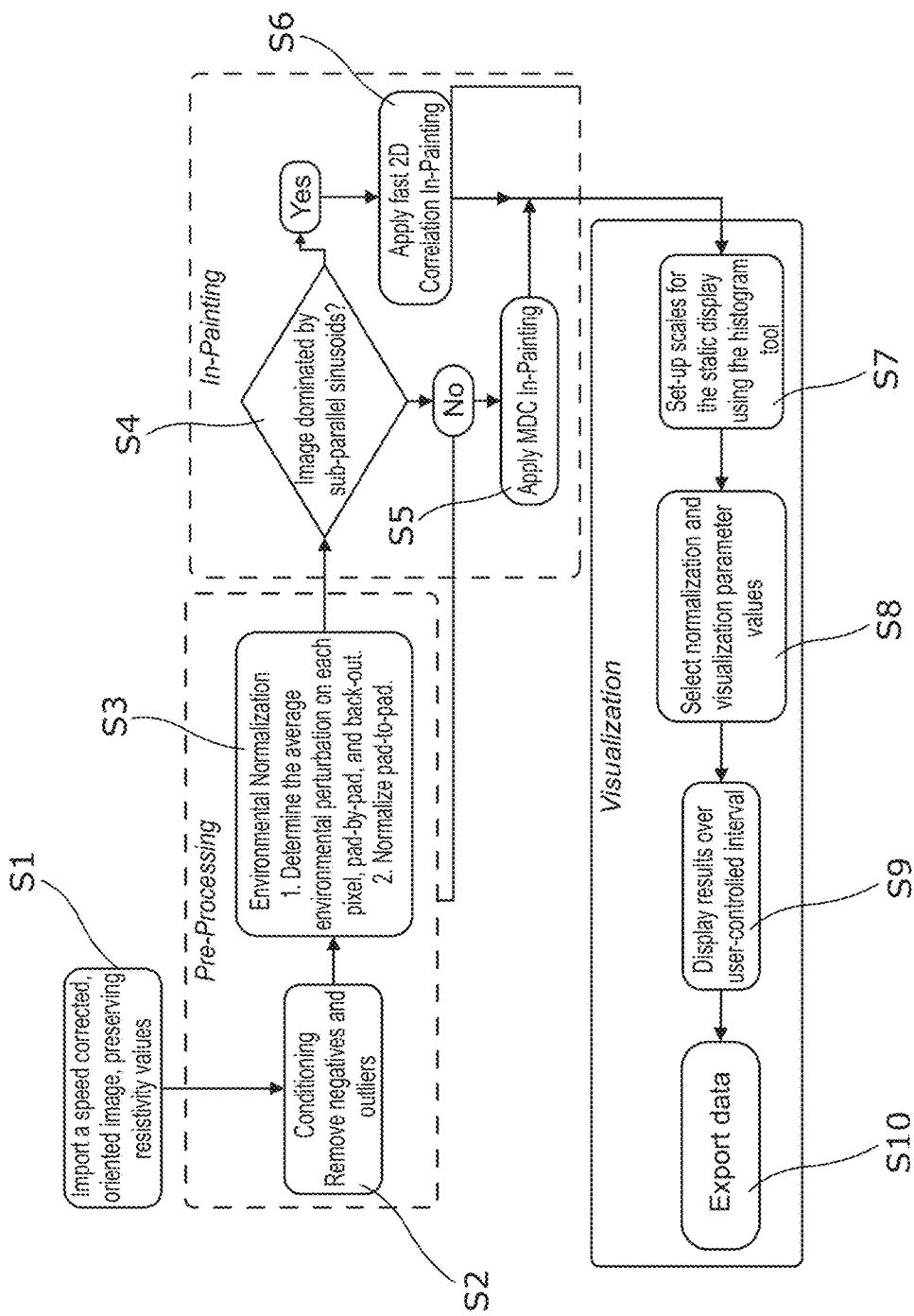
FIG. 4 is a flow-chart showing steps in the method of the invention, including pre-processing steps as defined herein and (in summary form) post-MCA visualisation steps that are related to the method of the invention.

FIG. 4 summarises the steps through which the pre-processing actions integrate with the steps of the MCA technique defined herein.

As represented by Step S1, the method of the invention involves initially importing a speed-corrected, oriented image from a log data acquisition program. The steps of the invention however are equally applicable to log data provided in the formats supported by numerous other log data conveying applications.

At Steps S2 and S3, the logic of the method of the invention includes one or more of the steps of:
a. identifying and taking account of one or more null values in the log data;
b. compensating for at least one variation in one or more environmental factors that are variable depending on the environment to which the log data pertain;
c. normalising data within specific areas of the log data; and
d. normalising data between specific areas of the log data, with Steps a., b., c. and d. optionally including further detailed aspects as set out in Paragraphs [0031] through [0050] hereof.

Such steps involve:

Dropout Removal

This routine removes null values that occasionally exist within pad data and replaces them with values interpolated from neighbouring points.

Data Driven Environmental Normalisations

It is known that the homogeneous environment sensitivity of each button varies systematically by across the pads. Additional to the sensitivity variation, the effect of standoff/mudcake causes a further systematic variation, this being substantially larger. It is more apparent on un-normalized inpainted images because of the lever effect associated with the pad edges. Moreover the variations are typically more complex and less smooth than obtained from models (which represent ideal cases). For this reason—and also because models cover only a sub-set of environments—it is necessary to derive the environmental normalizations from the data itself, taking account of the fact that the data is a superposition of information from the borehole and formation.

Within—Pad Normalization

This algorithm calculates and applies an environmental correction factor for each pixel within each pad. It would be preferable to perform the normalization on button data, but if the link to buttons is lost after creation of an image it will be necessary to work with pixels. Knowing the number of pixels across each pad stripe allows the method to infer button locations; taking the average resistivity of the centre pixel over a defined sliding depth window (excluding values likely to be associated with formation boundaries), the algorithm normalizes all other pixels on the pad to the central value.

The first step is the removal of all pixels with value −999.75 (or some other arbitrary null value used by the log data handling software), this being the value used by one form of data acquisition application to represent non-measured or null data.

Thereafter, the steps are:
A. For each strip of pixels representing a single pad, take a window centred on the current depth. For each line within the window it is convenient to re-sample each of the pad strips to the number of buttons on each pad. This makes it easier to perform the vertical averaging in step B (below) in cases where the number of pixels per strip is changing within a window due to changes in borehole size.
B. For each line in this window:
Determine the maximum and minimum value. If the ratio max/min is less than a threshold then this line is included in the computation of an average (or median) value for each column from the lines in the current window. Otherwise, when the ratio exceeds the threshold, the line is not included in this calculation.
C. Apply the normalization to the centre line (by dividing each pixel by the corresponding column average) regardless of whether the max/min ratio for this line is below the ratio threshold.
D. Resample the line back to the original resolution and place it in the normalized image output.

The calculation is repeated for each depth in the file. Note also that the normalization operates on the logarithms of the resistivity values, the algorithm converting back to linear resistivity at the end of the process.

Figure 11A:
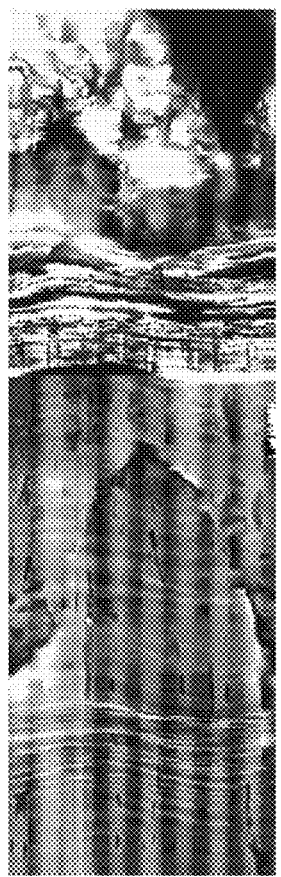
FIGS. 11a to 11b illustrate a phenomenon of residual differences between pads that in some cases also must be taken account of in processing of image log data in accordance with the invention.
Figure 11B:
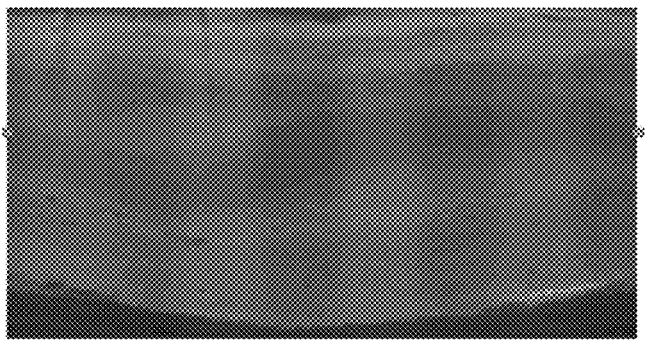

After within-pad normalization sometimes there exist residual differences between pads, as exemplified by FIGS. 11a and 11b.

This is due to a differential sensitivity to the environment associated with the upper and lower pads, and a second (between pad) normalization is needed to remove this.

In more detail, FIG. 11a shows borehole effects observed in an image that has been the subject of an In-Painting technique such as that defined herein. The visual effects apparent in FIG. 11a are the result of variations in resistivity values that as shown averaged in a depth window in FIG. 11b are somewhat pronounced from one pad of the resistivity logging tool to the next.

FIG. 11b shows that after correcting for environmental effects within each pad, small residual differences exist between the pad average values, the example being from a single geological bed. These residual differences are also normalized within the method described herein.

Between—Pad Normalization

This algorithm calculates the average of the within-pad normalized resistivity values for each pad, and normalizes them to a common value in order to remove any differential sensitivity between pads.

At Step S4, the method of the invention involves assessing the number of sub-parallel sinusoids in the thus pre-processed image under consideration and, depending on whether the number is more or less than a threshold value, selecting (Steps S5 and S6) either processing of the image data using the MCA In-Painting technique defined herein as part of the invention (if the number of sub-parallel sinusoids is below the threshold); or processing of the image data using a 2D correlation in-painting method.

As stated, the inventors have found that when the number of sub-parallel sinusoids is high the 2D correlation technique is a preferable way of filling in or otherwise taking account of the gaps in the image data caused by the nature of the image resistivity logging tool as explained above.

The reason for this is that when the number of sub-parallel sinusoids is at a high value the processing time and complexity associated with use of the MCA technique become unacceptable. The 2D correlation technique, involving less complex algorithms than the MCA method steps, may be completed in an acceptable processing cycle time in such circumstances.

If, however, the number of sub-parallel sinusoids is at an acceptable level, the MCA processing method steps, as defined herein, are preferable and therefore are selected at Step S6.

Figure 6:
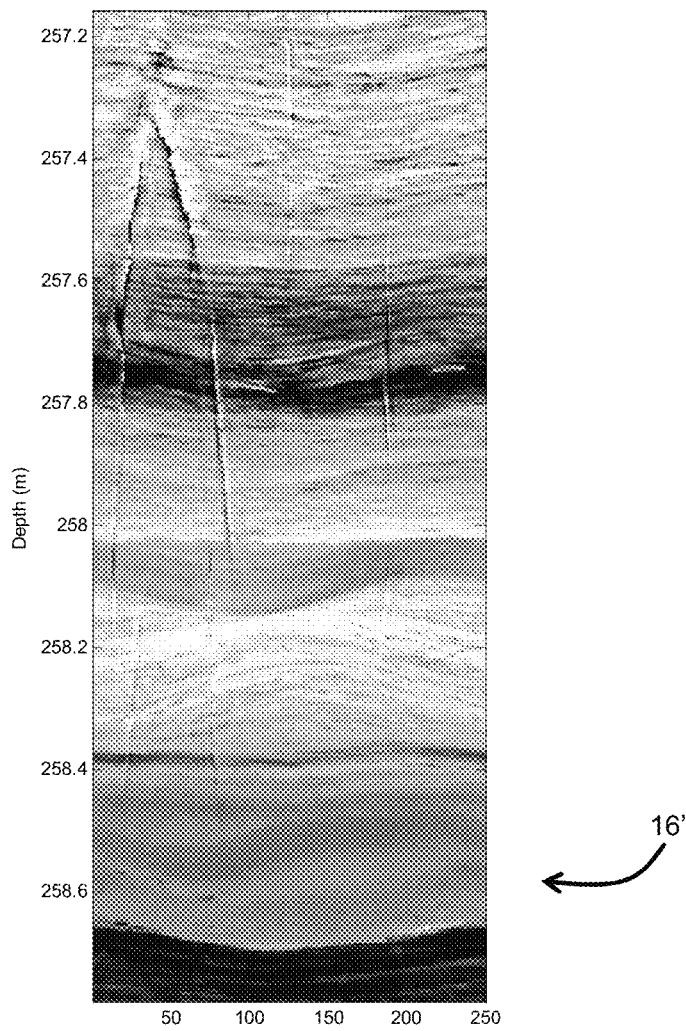
FIG. 6 shows an image log that is similar to those of FIGS. 2 and 3 and to which the method of the invention has been successfully applied in order to make up for missing data in the coherent bands visible in FIGS. 2 and 3.

Use of the MCA In-Painting steps of the method of the invention as defined herein gives rise to the complete image plot 16 visible in FIG. 6. As is apparent from the figure the missing data bands are filled in with very high accuracy and realism.

The image log of FIG. 6 is highly suitable for processing using automatic pattern recognition and machine interpretation techniques to the use of which, broadly, the invention additionally pertains. The Steps S7-S9 of the flowchart of FIG. 4 summarise some actions that are desirable in order to prepare the image log for such treatment. These visualisation steps do not form part of the invention as claimed herein.

Figure 5:
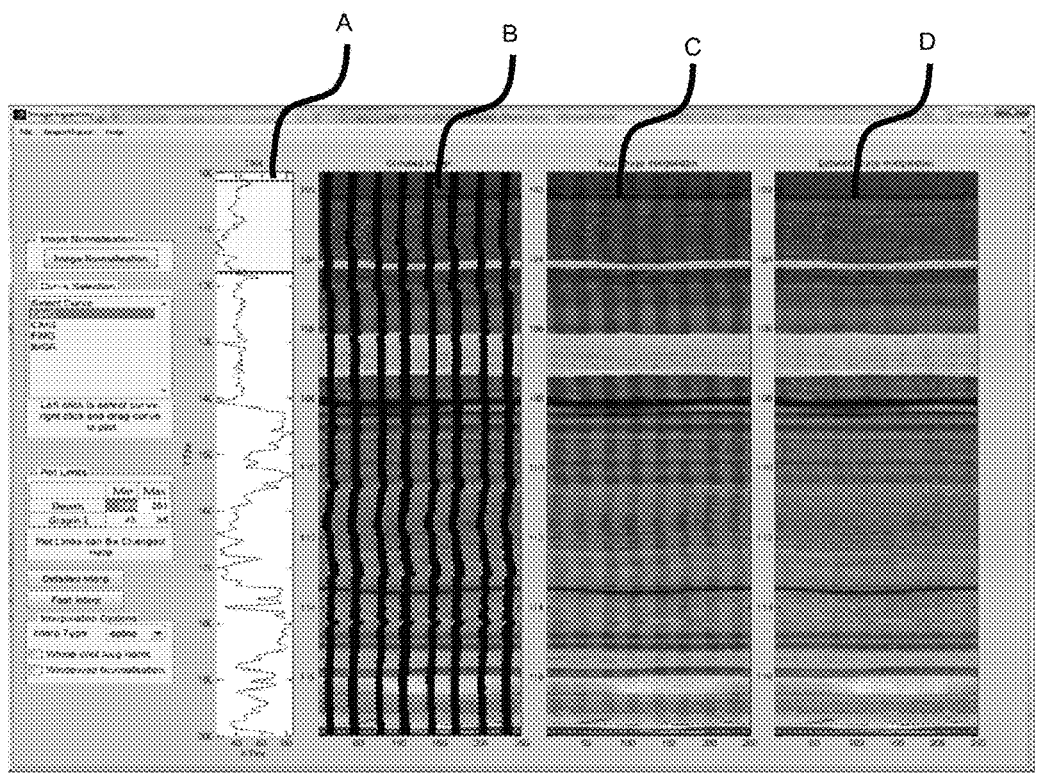
FIG. 5 is an image of a graphical user interface generated in a programmable device according to the invention and representing the output of the method steps of the invention.

The output of the steps of FIG. 4 may in accordance with the invention be presented in a graphical form as shown in FIG. 5. This illustrates one form (of many possible embodiments) of graphical interface that may arise in a programmable device, including a display that forms part of the apparatus of the invention.

In FIG. 5, Image Pane A shows the whole log data, using a per se known zoom function that is commonly employed for the purpose of viewing selected parts of image logs; Pane B shows the interrupted image that results from use of a resistivity image logging tool; and Panes C and D show the image log processed in accordance with steps according to the invention Thus, the apparatus of the invention is capable of presenting in-painted images in a convenient way that a log analyst or geologist may use when comparing the unprocessed image logs and those treated in accordance with the method of the invention.

The graphical interface typically would be provided at a surface-located computer to which the resistivity image logging tool is operatively connected or connectable for the purpose of transferring the log data. The interface of FIG. 5 however may in the alternative be provided at another location, and may indeed if desired be viewed a considerable distance away from the location at which logging of the borehole takes place.

Figure 7A:
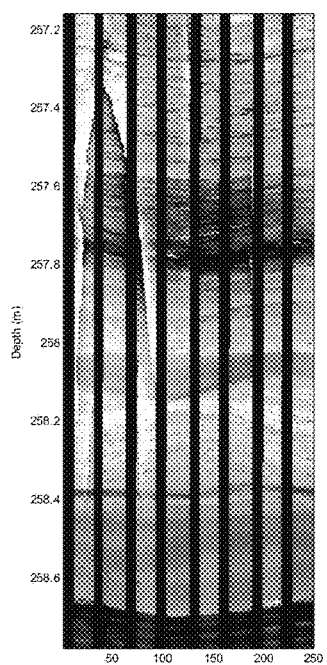
FIGS. 7a to 7c are a comparison between an originally generated image log (FIG. 7a) including the bands of missing data, an attempt at filling in the missing data using a prior art 1D interpolation technique (FIG. 7b) and the method of the invention (FIG. 7c)
Figure 7B:
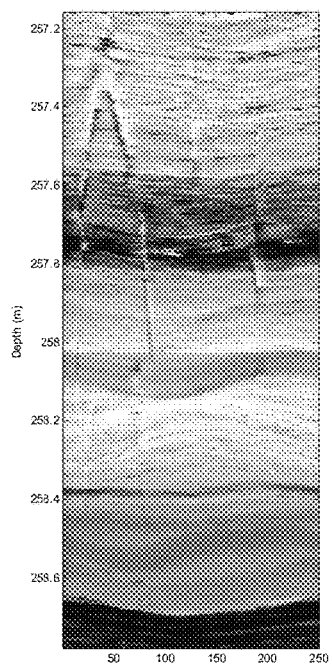
Figure 7C:
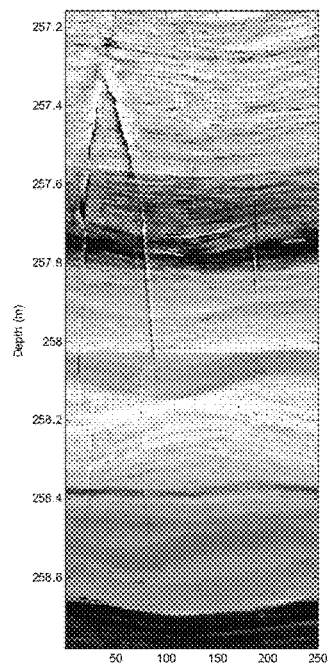

FIGS. 7a to 7c as mentioned are a comparison between an originally generated image log (FIG. 7a) including the bands of missing data, an attempt at filling in the missing data using a prior art 1D interpolation technique (FIG. 7b) and the method of the invention (FIG. 7c). As is apparent from FIGS. 7a to 7c although the prior art 1D interpolation technique produces some improvement over the untreated image log of FIG. 7a the resolution and accuracy of the image are not acceptable. The FIG. 7c image log on the other hand, that has undergone a process comprising the steps of in respect of one or more data dimensions associated with missing values in a log data set, decomposing the signal into a plurality of morphological components and morphologically reconstructing the signal such that missing values are estimated, is of superior quality.

Figure 8A:
FIGS. 8a to 8c are similar comparisons in which a need for environmental sensitivity adjustment in conjunction with the method of the invention, caused by the greater accuracy of the method of the invention than the prior art methods, is apparent.
Figure 8B:
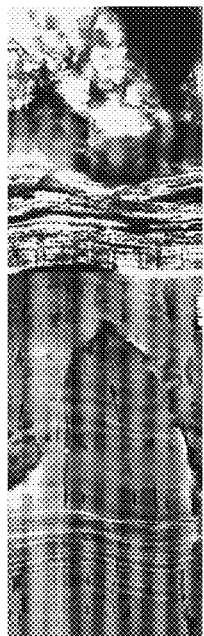
Figure 8C:

FIGS. 8a to 8c are a further comparison of an untreated resistivity image log (FIG. 8a), a 1D interpolation treated image log (FIG. 8b) and an image log treated in accordance with the method of the invention, in which a need for environmental sensitivity adjustment, caused by the greater accuracy of the method of the invention than the prior art methods, is apparent.

Figure 9A:
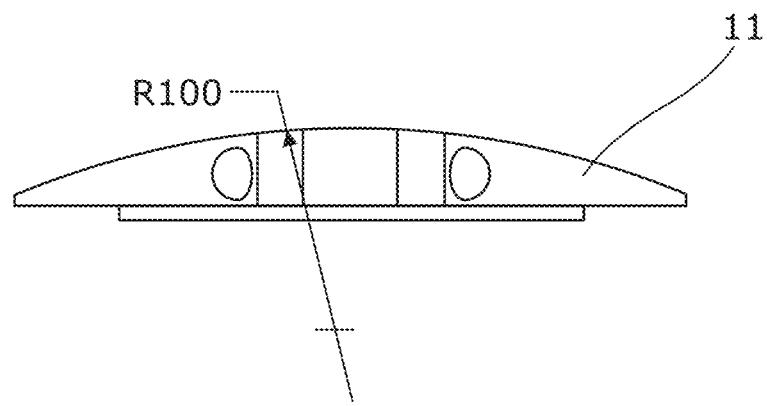
FIGS. 9a and 9b illustrate the dimensional aspects of a typical resistivity imaging tool pad that give rise to the environmental sensitivity considerations mentioned, 9a being a cross-section showing the pad curvature and 9b being indicative of the distribution of button electrodes on the face of the pad.

This phenomenon manifests itself as tramlines 18 that result from variations in the environmental sensitivity as defined herein from one side of a pad 12 to the other. Up to now it has been assumed that the value of environmental sensitivity is the same for all buttons in an array supported on a pad, but the method of the invention has revealed that the value in fact varies in a systematic way across the array. This is caused by the constant radius of curvature (that in the example illustrated in FIG. 9a is 100 mm) not being the same across the whole width of the pad 11 as that of the borehole wall against which it is pressed by the calliper arms supporting it; by the presence of a thin semi-permeable mudcake that commonly separates the pad from the borehole wall; and by variation in inherent sensitivity associated with the position of each button within each pad.

Figure 9B:
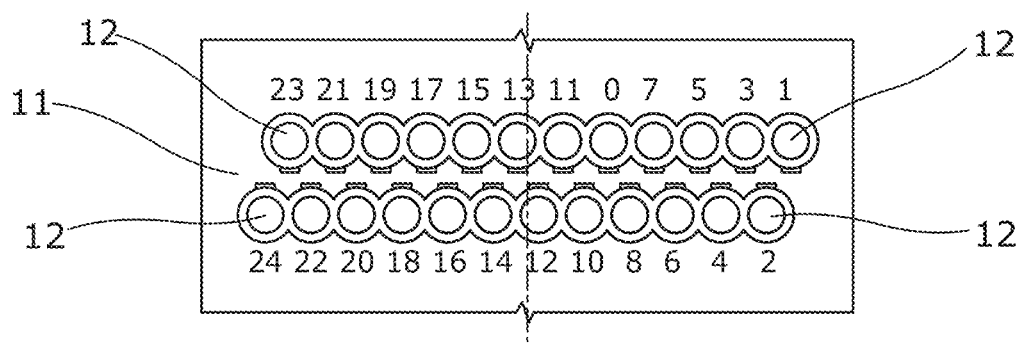

FIG. 9b incidentally clearly illustrates a typical lateral offset of adjacent rows of the buttons 12 in order to try and achieve continuous imaging coverage over the width of the pad 11, with the data voids 17 arising chiefly because of the gaps between the ends of the rows of buttons 12 shown and those of the next adjacent pads.

Figure 10:
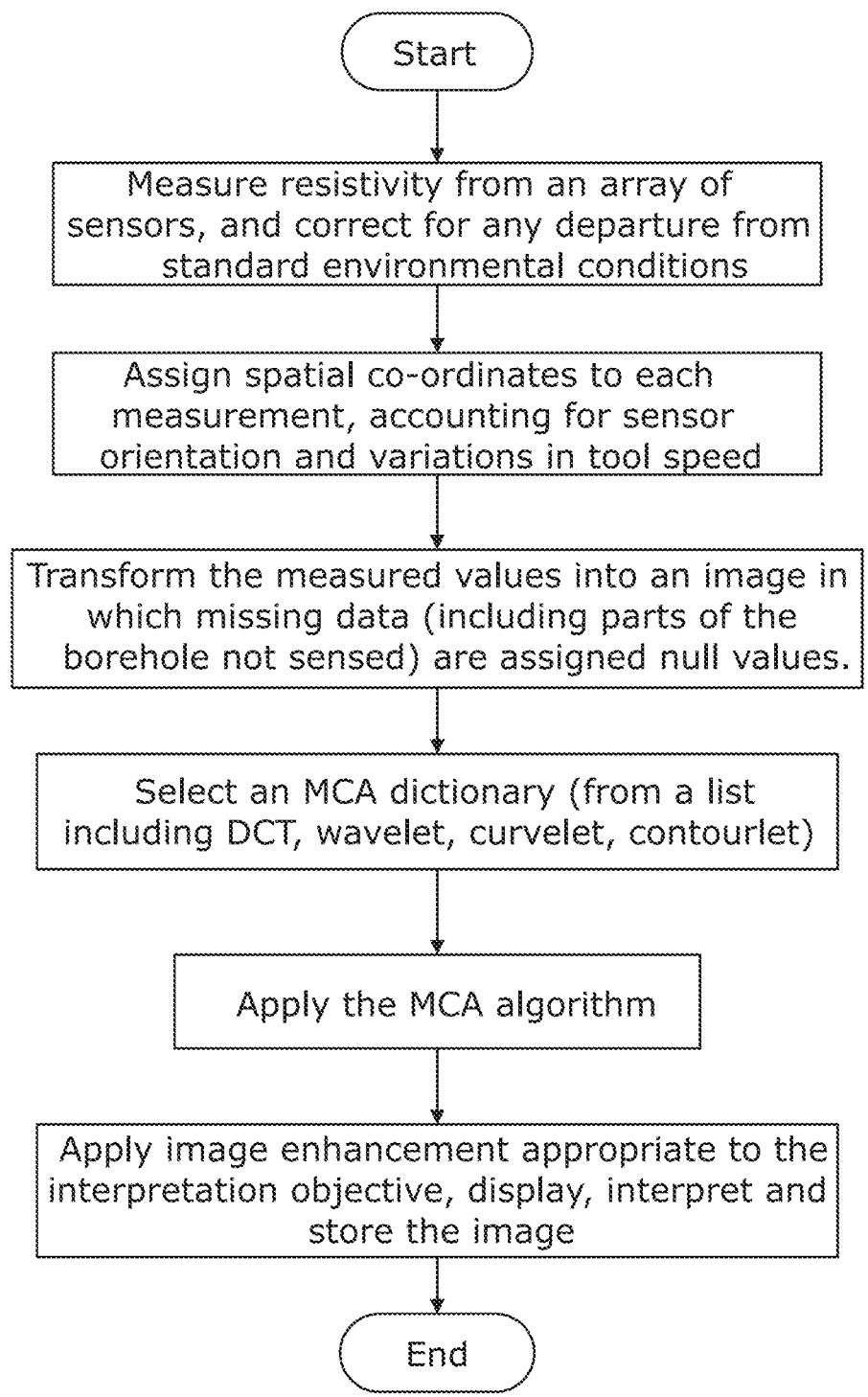
FIG. 10 is a flowchart summarising one practical implementation of the method of the invention, and hence showing the stage "Apply MCA In-painting" of the flowchart of FIG. 4 in more detail.

The steps of the MCA In-painting technique, assuming this is selected at Step S5 of FIG. 4, may be explained by the following. FIG. 10 summarises such method steps in flow chart form.

MCA Method Steps

MCA involves decomposing a signal or image into superposed contributions from different sources assuming it was built by layered information. In so doing it must solve an underdetermined system of equations—commonly considered to be problematic or even (arguably) intractable.

The fundamental problem is that an N-pixel image created by superposing K different types of morphological components offers N data values (the pixel values) but there may be as many as N×K unknowns (the contribution of each content type to each pixel).

The fact that there are more unknowns than equations makes the problem impossible to solve using conventional techniques. On the other hand, if prior information is available about the underlying object, then according to the work of the inventors such separation becomes possible using the special techniques described and claimed herein.

Morphologically decomposing a signal into its building blocks is an important challenge in signal and image processing. Part of this problem targets decomposition of the image to texture and piece-wise-smooth (cartoon) parts carrying only geometric information. MCA is based on the sparse representation of signals concept. It assumes that each signal is the linear mixture of several layers, the so-called Morphological Components, that are morphologically distinct, e.g. sines and bumps in the resistivity images. The success of this method relies on the assumption that—for every atomic signal behaviour to be separated—there exists a dictionary of atoms that enables its construction using a sparse representation. It is then assumed that each morphological component is sparsely represented in a specific transform domain.

When all transforms (each one attached to a morphological component) are amalgamated in one dictionary, each one must lead to sparse representation over the part of the signal it is serving, while being highly inefficient in representing the other content in the mixture. If such dictionaries are identified, the use of a pursuit algorithm searching for the sparsest representation leads to the desired separation. This is an important aspect of the method of the invention.

Figure 1:
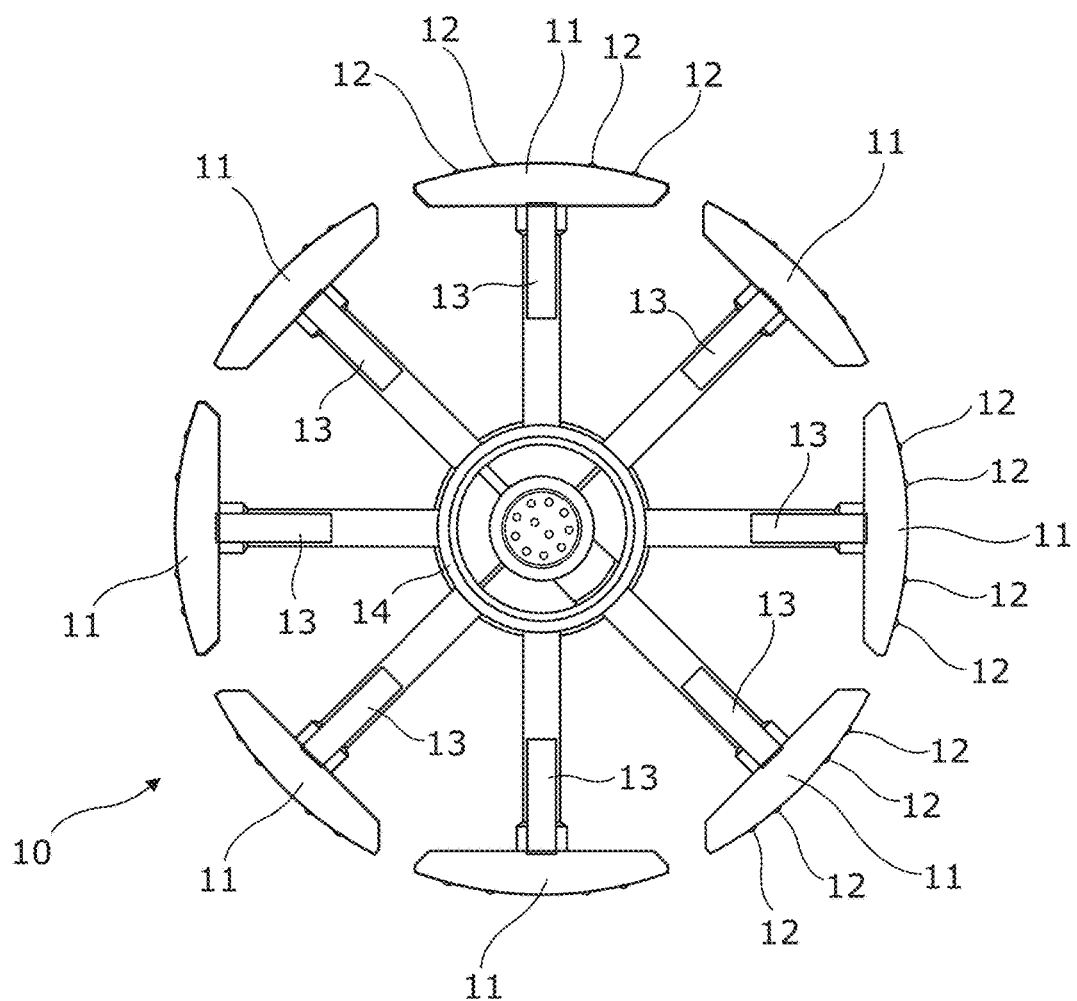
FIG. 1 is a transversely sectioned view of an eight-button micro-resistivity imaging tool.

MCA is capable of creating atomic sparse representations containing as a by-product a decoupling of the signal content. To exploit the MCA concept, one may consider the in-painting problem as a missing data estimation problem (the non-covered zone related to the gaps between pads). As explained above, in-painting herein means restoring missing data information not measured by the pad buttons of the resistivity tool based upon the measured available (observed) data. In other words, in-painting is an interpolation of the non-measured data due to the gap between pads (as exemplified by FIG. 1).

Following recent advances in modern harmonic analysis, many novel representations, including the wavelet transform, curvelet, contourlet, ridgelet, steerable or complex wavelet pyramids, are now known to be very effective in sparsely representing certain kinds of signals and images. For decomposition purposes, the dictionary will be built by taking the union of one or several (sufficiently incoherent) transforms, generally each corresponding to an orthogonal basis or a tight frame. The most tested and used dictionaries in the inventors' study of resistivity images are the wavelet and curvelet. The curvelet seems to outperform the wavelet for resistivity images, and hence the inventors decided to concentrate on the curvelet dictionary for an initial evaluation of the in-painting process.

The good performance of the curvelet versus wavelet dictionary is supported by the fact that most of the morphological components in resistivity images are curves (often sinusoids) related to bedding and fractures. While wavelets are certainly suitable for objects where the interesting phenomena, e.g. singularities, are associated with exceptional points, they appear ill-suited for detecting, organizing, or providing a compact representation of intermediate dimensional structures.

In general, curvelets are more appropriate tools in the case of resistivity image logs because they efficiently address very important problems where wavelet ideas are far from ideal—such as optimally sparse representation of objects with edges. Curvelets provide optimally sparse representations of objects which display curve-punctuated smoothness except for discontinuity along a general curve with bounded curvature. Such representations are nearly as sparse as if the object were not singular, and turn out to be far sparser than the wavelet decomposition of the object. The curvelet dictionary is also useful for optimal resistivity image reconstruction in severely ill-posed conditions (missing data). Curvelets also have special micro-local features which make them especially adapted to reconstruction problems with missing data and also from noisy and incomplete data (where some pads are not working properly for example).

Despite these reservations in the inventors' initial work, the invention is applicable in the case of using wavelets, or other representations as listed.

Resistivity images can contain both geometry and texture, so they demand approaches that work for images containing both cartoon and texture layers. The concept of MCA additively decomposing the image into layers is preferred, allowing a combination of layer-specific methods for filling in. In this way, the in-painting is done separately in each layer, and the completed layers are superposed to form the output image.

The MCA approach is based on optimising the sparsity of each layer's representation. The central idea is to use a set of dictionaries (wavelet, curvelet, or one of the other representations indicated), each one adapted to represent a specific feature. The dictionaries are mutually incoherent; each leads to sparse representations for its intended content type, while yielding non-sparse representations on the other content type.

The basis pursuit de-noising (BPDN) algorithm is relied upon for proper separation, as it seeks the combined sparsest solution, which should agree with the sparse representation of each layer separately. The BPDN algorithm was shown to perform well when constrained by total-variation (TV) regularization.

Overall the method and apparatus of the invention, regardless of the exact MCA method steps employed, permit significant improvements in the quality of image logs, and in particular resistivity image logs, for the reasons set out herein.

Resistivity Image Decomposition Using the MCA Approach

Consider the input image constructed from the measurement of the resistivity from the whole pads and the whole buttons, containing N total pixels, be represented as a 1D vector of length N by lexicographic ordering. To model images $\underline{Y}_n$ containing different geometrical structure, we assume that a matrix $A_n \in M^{N \times L}$ (where typically L>>N) allows sparse decomposition, written informally as $$Y_n = A_n x_n, \qquad (1)$$

where $x_n$ is sparse dictionary.

Here sparsity can be quantified by any of several different quasi-norms including the $l_o$ norm, which is equivalent to the number of non-zero components in the vector x and $l_p$-norms $\|x\|_p = (\Sigma |x(i)|^p)^{1/p}$ with p<1, with small values of any of these indicating sparsity. Sparsity measured in the $l_o$ norm implies that the texture image can be a linear combination of relatively few columns from $A_n$.

There are two more technical assumptions. First, localisation: the representation matrix $A_n$ is such that if the geometrical structure (cartoons) appears in parts of the image and is otherwise zero the representation is still sparse, implying that this dictionary employs a multi-scale and local analysis of the image content.

Second, incoherence: $A_n$ should not, for example, be able to represent texture images sparsely. We require that when $Y_n = A_n x_n$ is applied to images containing texture content, the resulting representations are non-sparse. Thus, the dictionary $A_n$ plays a role of a discriminant between content types, preferring cartoon content.

If we want to consider, for example, the texture layer, then another appropriate dictionary should be used where, in contrast to the above, a cartoon image is non sparsely represented by the new dictionary. This leads to a general case of decomposing the image in a multiple dictionary where the sparsity is specific for each content type.

Considering only one dictionary at time, and if we work with the $l_o$ norm as a definition of sparsity, we need to solve the following objective function:

$$\{x_n^{opt}\} = \underset{\{x_n\}}{\operatorname{argmin}} \|x_n\|_0 \text{ s.t. } \underline{Y} = A_n x_n \qquad (2)$$

This optimisation formulation should lead to a successful separation of the image content $A_n \underline{x}_n$ specific to the geometrical structure (cartoon), for example. This expectation relies on the assumptions made earlier about $A_n$ being able to sparsely represent one content type while being highly non-effective in sparsifying the other.

The formulated problem in Equation (2) is non-convex and seemingly intractable. Its complexity grows exponentially with the number of columns in the overall dictionary. The basis pursuit (BP) method suggests the replacement of the $l_o$-norm with an $l_1$-norm, thus leading to a tractable convex optimization problem, in fact being reducible to linear programming:

$$\{x_n^{opt}\} = \underset{\{x_n\}}{\operatorname{argmin}} \|x_n\|_1 \text{ s.t. } \underline{Y} = A_n x_n \qquad (3)$$

For certain dictionaries and for objects that have sufficiently sparse solutions, the BP approach can actually produce the sparsest of all representations.

If the image is noisy it cannot be cleanly decomposed into sparse cartoon layers. Therefore a noise-cognizant version of BP can be used:

$$\{\underline{x}_n^{opt},\} = \underset{\{\underline{x}_n\}}{\operatorname{argmin}} \|\underline{x}_n\|_1 \text{ s.t. } \|\underline{Y} - A_n \underline{x}_n\|_2 < \varepsilon \qquad (4)$$

The decomposition of the image in that case is only approximate, leaving some error to be absorbed by content that is not represented well by the appropriate dictionary. The parameter ε stands for the noise level in the image.

Alternatively, the constrained optimization in Equation (4) can be replaced by an unconstrained penalized optimization. Both noise-cognizant approaches have been analyzed theoretically, providing conditions for a sparse representation to be recovered accurately.

Also useful in the context of sparsity-based separation is the imposition of a total variation (TV) penalty. This performs particularly well in recovering piecewise smooth objects with pronounced edges—i.e., when applied to the curve (sinusoid) layer. It is most conveniently imposed as a penalty in an unconstrained optimization:

$$\{\underline{x}_n^{opt}\} = \underset{\{\underline{x}_n\}}{\operatorname{argmin}} \|\underline{x}_n\|_1 + \lambda \|\underline{Y} - A_n \underline{x}_n\|_2^2 + \gamma TV\{A_n \underline{x}_n\} \qquad (5)$$

where the total variation of an image I, TV(I) is essentially the $l_1$-norm of the gradient. Penalising with TV forces the image $A_n \underline{x}_n$ to have a sparser gradient, and hence to be closer to a piecewise smooth image.

Note that $A_n$, should be a known transform. For texture content one may use transforms such as local Discrete Cosine Transform DCT, Gabor or wavelet packets (that typically are oscillatory ones to fit texture behaviour). For the cartoon content one can use wavelets, curvelets, ridgelets, or contourlets, and there are several more options. In both cases, the proper choice of dictionaries depends on the actual content of the image to be treated or even a combined version of the above dictionaries when necessary. The best choice of the curvelet transform for in-filling the gaps between pads depends on a priori knowledge of the resistivity images and on some experience conducted on different real data recorded from different wells. This choice made may vary for other images with other contexts (an example being sonic images).

Resistivity Image In-painting Using MCA

Assume that the missing pixels between pads are indicated by a 'mask' matrix $M \in M^{N \times L}$. The main diagonal of M encodes the pixel status, namely '1' for an existing pixel and '0' for a missing one. Thus, in the equation (5) we can incorporate this mask by $$\{\underline{x}_n^{opt}\} = \underset{\{\underline{x}_n\}}{\operatorname{argmin}} \|\underline{x}_n\|_1 + \lambda \|\underline{M(Y} - A_n \underline{x}_n\|_2^2 + \gamma TV\{A_n \underline{x}_n\} \qquad (6)$$

Doing this, one desires an approximate decomposition of the input image X to cartoon parts $A_n \underline{x}_n$, and the fidelity of the representation is measured with respect to the existing measurements only, disregarding missing pixels. The idea is that once $A_n \underline{x}_n$ are recovered, those represent entire images, where the missing data in the gaps are filled in by the dictionary basis function.

The total-variation penalty in Equation (6) suppresses the typical ringing artefacts encountered in using linear transforms. This can be crucial near sharp edges, where ringing artefacts are strongly visible.

The above models (6) consider the image as a whole and are not based on local information only. Thus, multiscale relations that exist in the image that could be exploited are overlooked.

Overall, the method and apparatus of the invention, regardless of the exact MCA method steps employed, permit significant improvements in the quality of image logs, and in particular resistivity image logs, for the reasons set out herein.

The listing or discussion of an apparently prior-published document in this specification should not necessarily be taken as an acknowledgement that the document is part of the state of the art or is common general knowledge.

What is claimed is:

1. A method of image processing implemented with one or more processing devices, the method comprising:
   obtaining, with the one or more processing devices, image information derived from geological log data signals generated through use of a logging tool having one or more electrodes interacting with a formation intersected by a borehole;
   constructing, with the one or more processing devices, missing image information missing from the obtained image information due to destroyed or occluded parts of the obtained image information by using cues from observed data comprising the steps of:
      in respect of one or more data dimensions associated with missing values in a log data set, decomposing the log data signal into a plurality of morphological components, and
      morphologically reconstructing the log data signal such that missing values are estimated; and
   producing, with the one or more processing devices, a resulting image incorporating the missing image information into the obtained image information.

2. The method of claim 1, comprising performing the steps of decomposing and morphologically reconstructing in respect of all the missing information in the data set.

3. The method of claim 1, wherein the decomposition includes use of a dictionary of elemental bases including one or more selected from the list including discrete cosine transforms, wavelet transforms, wavelet packet transforms, ridgelet transforms, curvelet transforms, and contourlet transforms.

4. The method of claim 1, comprising the step of performing one or more automatic feature recognition and/or machine interpretation steps following the step of morphologically reconstructing.

5. The method of claim 4, wherein at least one said automatic feature recognition and/or machine interpretation step comprises one or more of an edge recognition step and/or a texture recognition step.

6. The method of claim 1, comprising the step of separating each elemental signal base into a plurality of respective morphological components on the basis of an assumption that in order for each elemental signal base to be separated there exists a dictionary of elemental bases enabling its construction using a sparse representation.

7. The method of claim 6, further comprising the steps of:
   assuming that each respective morphological component is sparsely represented in a specific transform domain; and
   amalgamating each transform attached to a respective morphological component into a dictionary.

8. The method of claim 7, comprising the step of identifying the sparsest representation of morphological components and using the thus-identified components to de-couple the components of the signal content.

9. The method of claim 8, comprising using a basis pursuit (BP) algorithm to carry out the step of identifying.

10. The method of claim 1, wherein the morphological components comprises texture and piece-wise parts.

11. The method of claim 10, wherein the piece-wise parts comprise image content; and wherein the step of decomposing comprises decomposing the image parts in elemental contents; and wherein the method comprises separately constructing information missing from the elemental contents, before performing the step of morphologically reconstructing.

12. The method of claim 11, wherein the geological log data signals are measures of formation resistivity in the form of an image containing N pixels and wherein the method includes representing the geological log data signals as a one-dimensional vector, of length N, by lexicographic ordering.

13. The method of claim 12, wherein the step of decomposing comprises representing the image content by a dictionary:
$A_{n \in M}^{N \times L}$
wherein a pursuit algorithm is such that the image content is sparsely represented in dictionary $A_n$.

14. The method of claim 13, wherein sparsity is quantified by one of a plurality of quasi-norms.

15. The method of claim 14, wherein the quasi-norm is the $l_0$ norm, which is equivalent to the number of non-zero components in the vector x and $l_p$-norms $\|x\|_{p=(\Sigma|x(i)|^p)^{1/p}}$ with p<1, and in which small values of any of these indicate sparsity.

16. The method of claim 15, wherein the pursuit algorithm seeks to solve $$\{x_n^{opt}\} = \underset{\{x_n\}}{\operatorname{argmin}} \|x_n\|_0 \text{ s.t. } \underline{Y} = A_n \underline{x}_n$$

with the result that $A_n \underline{x}_n$ contains the image content.

17. The method of claim 14, wherein the quasi-norm is the $l_1$ norm, and wherein the pursuit algorithm seeks to solve $$\{x_n^{opt}\} = \underset{\{x_n\}}{\operatorname{argmin}} \|x_n\|_1 \text{ s.t. } \underline{Y} = A_n \underline{x}_n$$

with the result that $A_n \underline{x}_n$ contains the image content.

18. The method of claim 17, wherein the pursuit algorithm is a basis pursuit (BP) that solves the expression using linear programming.

19. The method of claim 17, wherein the pursuit algorithm seeks to solve $$\{x_n^{opt}\} = \underset{\{x_n\}}{\operatorname{argmin}} \|x_n\|_1 \text{ s.t. } \|\underline{Y} - A_n \underline{x}_n\|_2 < \varepsilon$$

in which ε is a parameter corresponding to the level of noise in the image log Y, with the result that $A_n \underline{x}_n$ contains the image content.

20. The method of claim 17, wherein the pursuit algorithm seeks to solve $$\{x_n^{opt}\} = \underset{\{x_n\}}{\operatorname{argmin}} \|x_n\|_1 + \lambda \|\underline{Y} - A_n \underline{x}_n\|_2^2 + \gamma TV\{A_n \underline{x}_n\}$$

in which TV represents a total variation penalty and the parameter λ>0 is a scalar representation parameter and the total variation penalty increases the sparseness gradient of $A_n \underline{x}_n$, with the result that $A_n \underline{x}_n$ contains the image content.

21. The method of claim 12, further comprising compensating for at least one variation in one or more environmental factors that are variable depending on the environment to which the geological log data signals pertain by assuming that pixels of an image log corresponding to missing log data are indicated by a mask matrix $M \in M^{N \times L}$ the main diagonal M of which encodes the pixel status as 1 in the case of an existing pixel and 0 is the case of missing data and wherein the pursuit algorithm seeks to solve $$\{x_n^{opt}\} = \underset{\{x_n\}}{\operatorname{argmin}} \|x_n\|_1 + \lambda \|\underline{M(Y} - A_n \underline{x}_n)\|_2^2 + \gamma TV\{A_n \underline{x}_n\}$$

with the result that $A_n \underline{x}_n$ contains the image content.

22. The method of claim 1, wherein obtaining, with the one or more processing devices, the geological log data signals generated through use of the logging tool having the one or more electrodes interacting with the formation intersected by the borehole comprises logging the formation by operating the logging tool in the borehole to interact the one or more electrodes with the formation.

23. A resistivity image logging tool having operatively connected or connectable thereto one or more processing devices for carrying out, on data signals generated by the tool, a method according to claim 1.

* * * * *